US008489827B2

(12) United States Patent
Shin et al.

(10) Patent No.: US 8,489,827 B2
(45) Date of Patent: Jul. 16, 2013

(54) METHOD AND SYSTEM FOR STORAGE-SYSTEM MANAGEMENT

(75) Inventors: George Shin, Boise, ID (US); William B. Bouldin, Colorado Springs, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 289 days.

(21) Appl. No.: 12/914,079

(22) Filed: Oct. 28, 2010

(65) Prior Publication Data
US 2012/0110277 A1 May 3, 2012

(51) Int. Cl.
*G06F 13/00* (2006.01)
*G06F 13/28* (2006.01)

(52) U.S. Cl.
USPC ......... 711/154; 711/E12.002; 713/1; 713/100

(58) Field of Classification Search
USPC .................. 711/154, E12.002; 713/1, 100
See application file for complete search history.

(56) References Cited

U.S. PATENT DOCUMENTS

| | | | |
|---|---|---|---|
| 6,496,914 B1 | 12/2002 | Vook et al. | |
| 6,785,742 B1 | 8/2004 | Teow et al. | |
| 6,816,917 B2 | 11/2004 | Dicorpo et al. | |
| 7,069,354 B2 | 6/2006 | Poonie et al. | |
| 7,636,818 B2 | 12/2009 | Tamura et al. | |
| 2001/0047482 A1* | 11/2001 | Harris et al. | 713/200 |
| 2007/0288535 A1* | 12/2007 | Shitomi et al. | 707/204 |
| 2009/0119087 A1 | 5/2009 | Ang et al. | |
| 2009/0119684 A1 | 5/2009 | Mahalingam et al. | |
| 2010/0058335 A1* | 3/2010 | Weber | 718/1 |
| 2010/0080090 A1* | 4/2010 | Spivak et al. | 369/30.28 |
| 2010/0115049 A1* | 5/2010 | Matsunaga et al. | 709/216 |
| 2010/0250878 A1* | 9/2010 | Ichikawa et al. | 711/162 |
| 2010/0268816 A1* | 10/2010 | Tarui et al. | 709/224 |

\* cited by examiner

*Primary Examiner* — Edward Dudek, Jr.

(57) ABSTRACT

One example of the present invention is directed to a data-storage system comprising a plurality of data-storage devices, one or more communications connections through which the data-storage system receives management and data-access commands and sends responses to received commands, and one or more processors. The one or more processors execute controller functionality that controls command and response exchanges through the communications connections, accesses the data-storage devices, and provides a data-storage-system interface that includes a management-interface portion that provides access to management functionality, a data-interface portion that provides access to data-access functionality, and a management-interface tunnel that provides alternative access to management functionality through the data-interface portion of the data-storage-system interface.

19 Claims, 12 Drawing Sheets

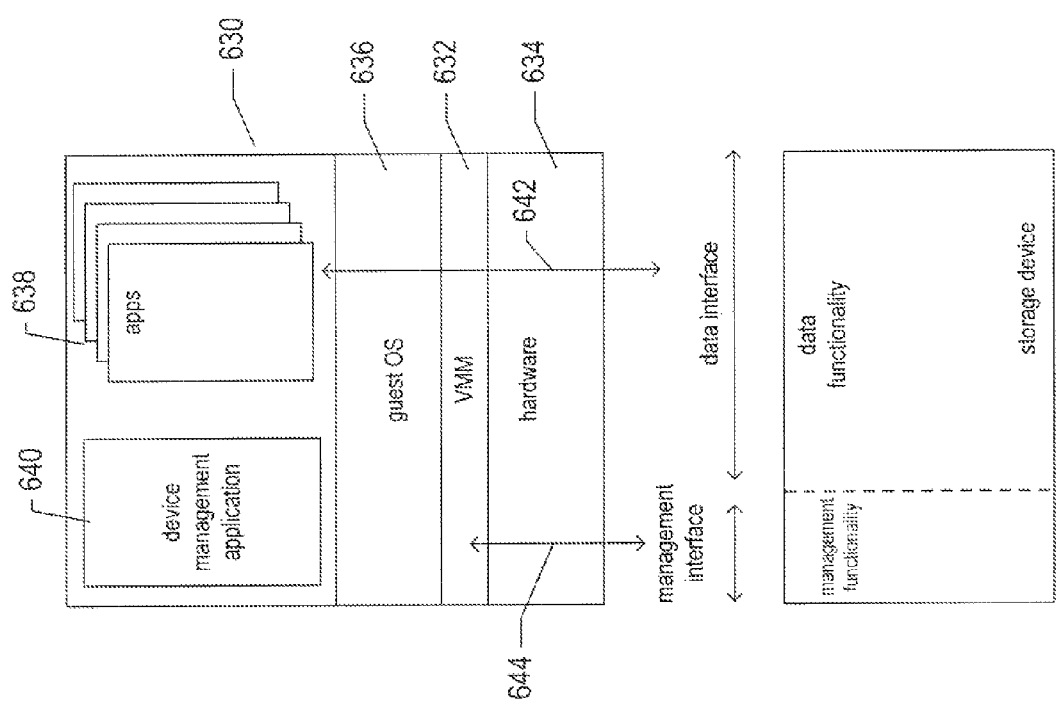

METHOD AND SYSTEM FOR STORAGE-SYSTEM MANAGEMENT

BACKGROUND

Electronic data-storage components and systems are integral components and subsystems of modem computing environments, including large distributed computing systems containing multiple networked computers and multiple networked data-storage subsystems. In early computers, data was principally stored in various types of electronic memory within individual stand-alone computers. Mass-storage devices were subsequently developed, including magnetic-tape and disk-storage devices, to provide for greater storage capacities, non-volatile data storage, and transportable stored data. Mass-storage devices have evolved as quickly as, and, in certain cases, even more rapidly than computer processors and computer systems. The densities at which data can be stored on disk-platter surfaces and optical-disk surfaces has increased even more quickly than the densities at which integrated-circuit components, such as transistors, can be manufactured on the surfaces of silicon dies.

Not only have the densities at which data can be stored increased rapidly, over the past decades, but the functionalities of mass-storage devices have also rapidly evolved. Network data-storage devices and systems, such as disk arrays, currently provide enormous data-storage capacities as well as flexible and powerful interfaces for storing and managing data by remote host computers. In many cases, these high-end data-storage systems provide logical-unit-based interfaces that allow host computers to create various types of logical units that are mapped, by data-storage-device controllers, through various levels of interfaces to mass-storage devices and data-block addresses within mass-storage devices. Logical units, including logical disks, may be automatically mirrored or redundantly stored according to various types of redundancy schemes, including erasure-coding or parity-encoding redundancy schemes. Moreover, logical units may be automatically geographically dispersed, automatically archived, and associated with various other features and facilities provided by data-storage systems. Disk arrays and other high-end data-storage systems that provide logical-unit interfaces to host computers may provide a variety of different types of operations that can be carried out on, or directed to, logical units, including data-access operations, such as READ and WRITE operations, and many different types of management operations, including operations for configuring logical disks, initializing or reinitializing logical disks, and requesting current values and setting values of various operational and control parameters.

Computer systems which access data-storage systems through communications media have also evolved, over time. These computer systems may support various types of data-storage-system-management applications, which allow system administrators and other users to configure and maintain data-storage systems remotely through various types of graphical management interfaces. Complex systems developed for operation in execution environments provided by operating systems running directly above physical computer hardware may now, instead, run in execution environments provided by operating systems running within the context of a virtual machine above a virtual-machine monitor that executes immediately above the hardware level of one or more physical systems. The evolution of host systems is often relatively independent from the evolution of remote data-storage systems accessed by the host systems. Because the data-storage systems provide well-defined management and data-access interfaces, host systems may freely evolve as long as they continue to interoperate with data-storage systems through well-known data-storage-system interfaces. However, as host systems become more complex, and run within more complex computational environments, additional control layers and interfaces may be interposed between host systems and data-storage-system interfaces provided by data-storage systems that can complicate or frustrate interoperation of host systems and data-storage systems. Ongoing research and development efforts are directed to preserving host-system interoperability with data-storage systems in rapidly evolving computational environments.

BRIEF DESCRIPTION OF THE DRAWINGS

FIGS. 6A-C illustrate projection of the data-storage-system interface through, various layers of a remote computer system including, as an example of the present invention shown in FIG. 6C, by means of a management-interface tunnel through an intervening virtual-machine monitor or hypervisor.

DETAILED DESCRIPTION

Implementations of the present invention are directed to preserving host-system interoperability with data-storage systems as the computational and communications environments in which the host systems and data-storage systems operate evolve and change. In particular, implementations of the present invention are directed to preserving host-system interoperability with data-storage systems when the host systems execute in the context of virtual machines running above virtual-machine monitors, rather than executing above physical machines. In order to facilitate discussion of the present invention, an overview of computer-system and data-storage-system architectures and virtual-machine monitors is first provided, immediately below, in a first subsection. In a following second subsection, several examples of the present invention are described with reference to illustrations and control-flow diagrams.

Figure 1:
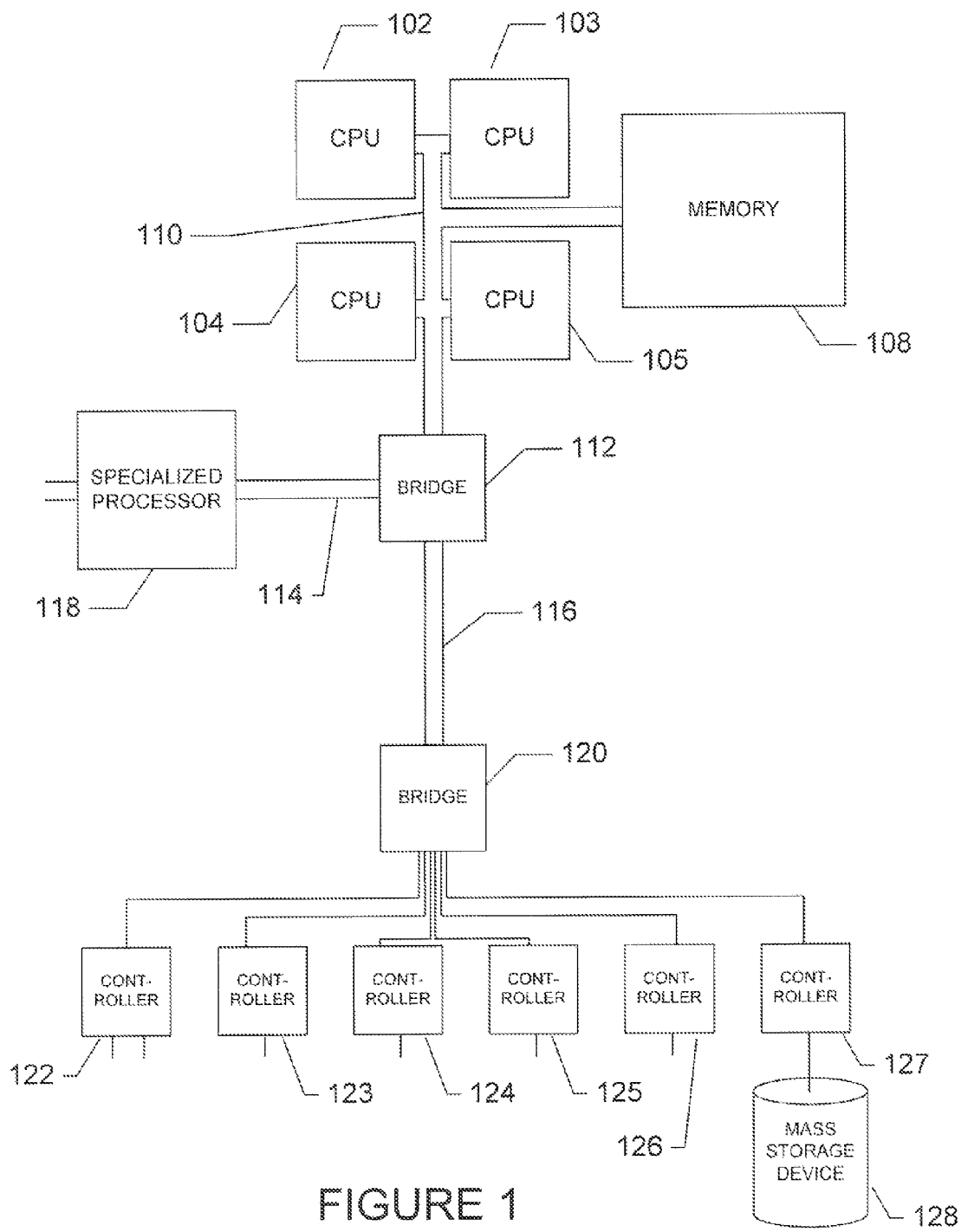
FIG. 1 illustrates a general-purpose computer architecture.

Computer-System and Data-Storage-System Architectures and Virtual-Machine Monitors FIG. 1 illustrates a general-purpose computer architecture. The internal components of many small, mid-sized, and large computer systems as well as specialized processor-based storage systems can be described with respect to this generalized architecture, although each particular system may feature many additional components, subsystems, and similar, parallel systems with architectures similar to this generalized architecture. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect. the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational resources.

It is common, in distributed and networked computational environments, for multiple physical computer systems to be connected with one another and with a variety of special-purpose systems, including data-storage systems. Data-storage systems, such as disk arrays and other mass-storage systems, provide enormous data-storage capacities as well as high availability, fault tolerance, and other desirable characteristics and features. Data-storage systems provide data-storage-system interfaces that allow multiple host computers, and multiple applications executing within each of the multiple host computers, to store and retrieve data and, in many cases, to share data with other applications executing on the same and on remote host computer systems.

Figure 2:
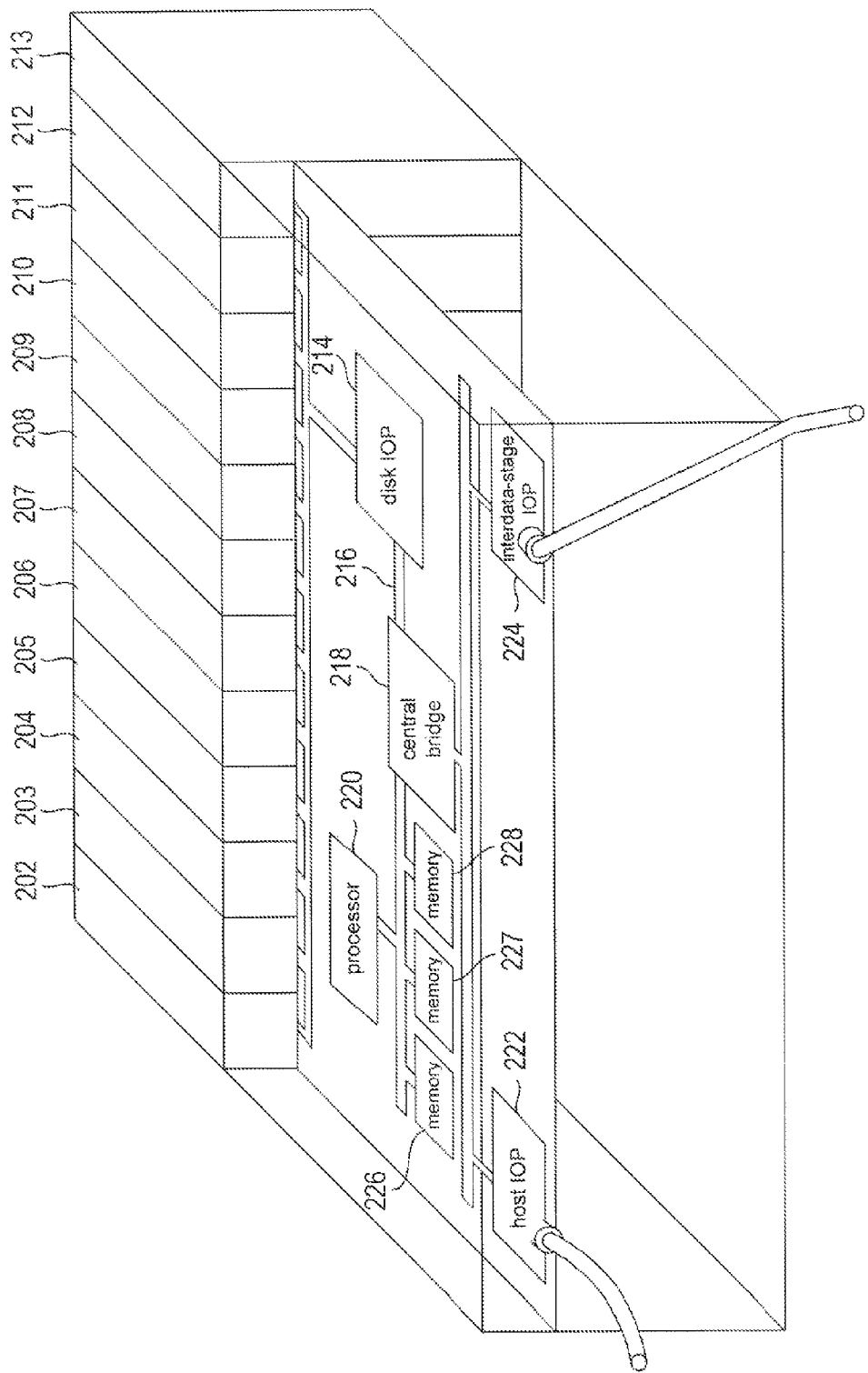
FIG. 2 shows a high-level diagram of an example data-storage system.

FIG. 2 shows a high-level diagram of an example data-storage system. The data-storage system illustrated in FIG. 2 includes 12 data-storage devices 202-213 that interface to an I/O processor 214. The I/O processor 214 is interconnected through one or more high-speed busses 216 to a central bridge device 218. The central bridge 218 is, in turn, interconnected to one or more general processors 220, a host I/O processor 222, an inter-data-storage system I/O processor 224, and one or more memories 226-228. The host I/O processor 222 provides a communications interface to a communications medium through which the data-storage system communicates with remote host, computers. The interdata-storage system I/O processor 224 provides a communications interface to a communications medium through which the data-storage system communicates with other data-storage systems. The one or more general processors 220 execute a control program for, among many tasks and responsibilities, processing requests from remote host computers and remote data-storage systems, managing state information stored in the one or more memories 226-228 and on data-storage devices 202-213, and managing data storage and data consistency within the data-storage system. The one or more memories serve as a cache for data as well as a storage location for various computational entities, including timestamps and data structures, used by control processes that control access to data stored within the data-storage system and that maintain data within the data-storage system in a consistent state. The memories typically include both volatile and non-volatile memories. A data-storage system may also contain numerous other components not shown in FIG. 2, including one or more power supplies, cooling systems, control panels or other external control interfaces, standard random-access memory, and other such components.

In large computational facilities, it is becoming increasingly common for various types of application and system software that, in the past, executed on separate, physical computer systems to instead run within the context of virtual machines provided by virtual-machine monitors that execute on one or more physical computer systems. Virtual-machine monitors provide numerous advantages for designers and operators of computational facilities, including the ability to maintain multiple, parallel operating systems independent from the physical computer systems on which the operating systems execute. In the past, operating systems tended to be closely tied to particular hardware platforms, and application programs were, in turn, tied to particular operating systems. These types of dependencies often resulted in computational facilities needing to purchase and maintain a variety of different types of hardware systems in order to support execution of a variety of different application programs and system programs desired by clients. Virtual-machine monitors remove many of these dependencies, so that computing centers can employ and maintain fewer types of hardware systems while still providing a wide variety of application programs and system programs to users. Virtual-machine monitors may also facilitate run-time relocation of application programs and operating systems from one physical machine to another, which in turn facilitates high-availability and fault tolerance.

Figure 3:
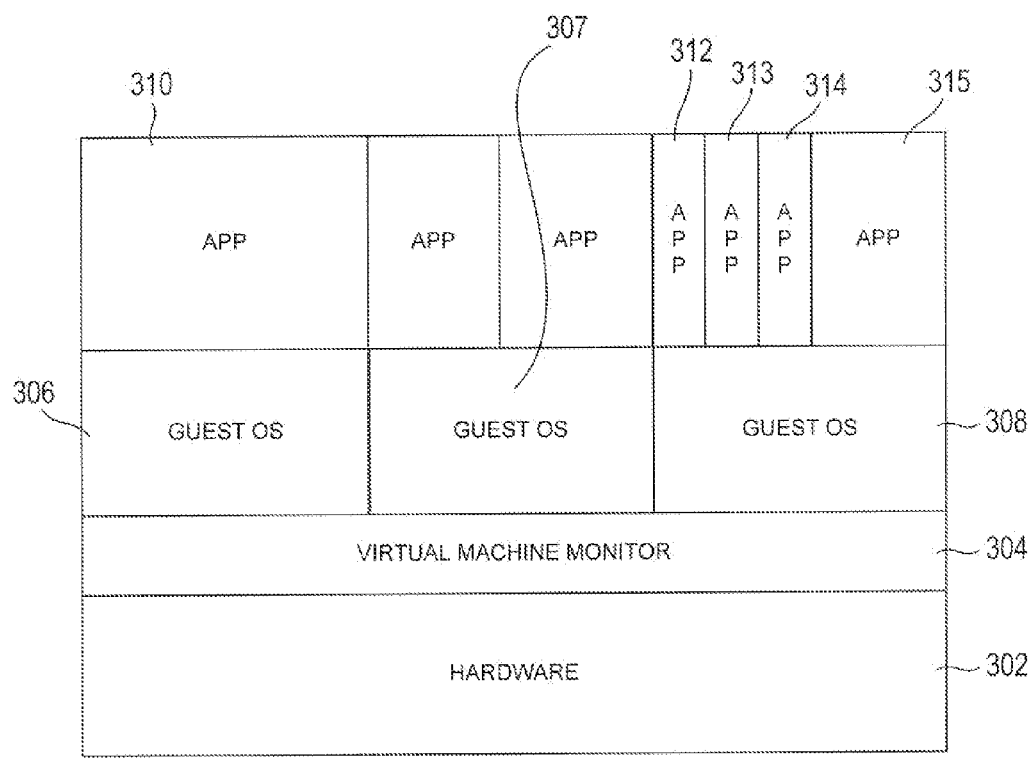
FIG. 3 illustrates the position of a virtual-machine monitor within a common hierarchical abstraction of a computer system.

FIG. 3 illustrates the position of a virtual-machine monitor within a common hierarchical abstraction of a computer system. In FIG. 3, a lower layer 302 represents the physical hardware of a computer system. The virtual-machine monitor 304 is a first firmware/software layer above the hardware level, and supports execution of one or more guest operating systems 306-308, each of which, in turn, provides a computational environment for execution of one or more application programs. For example, guest operating system 306 supports a single application program 310 while guest operating system 308 supports execution of four application programs 312-315. The virtual-machine monitor may provide a different virtual-machine interface to each of the guest operating systems.

Figure 4:
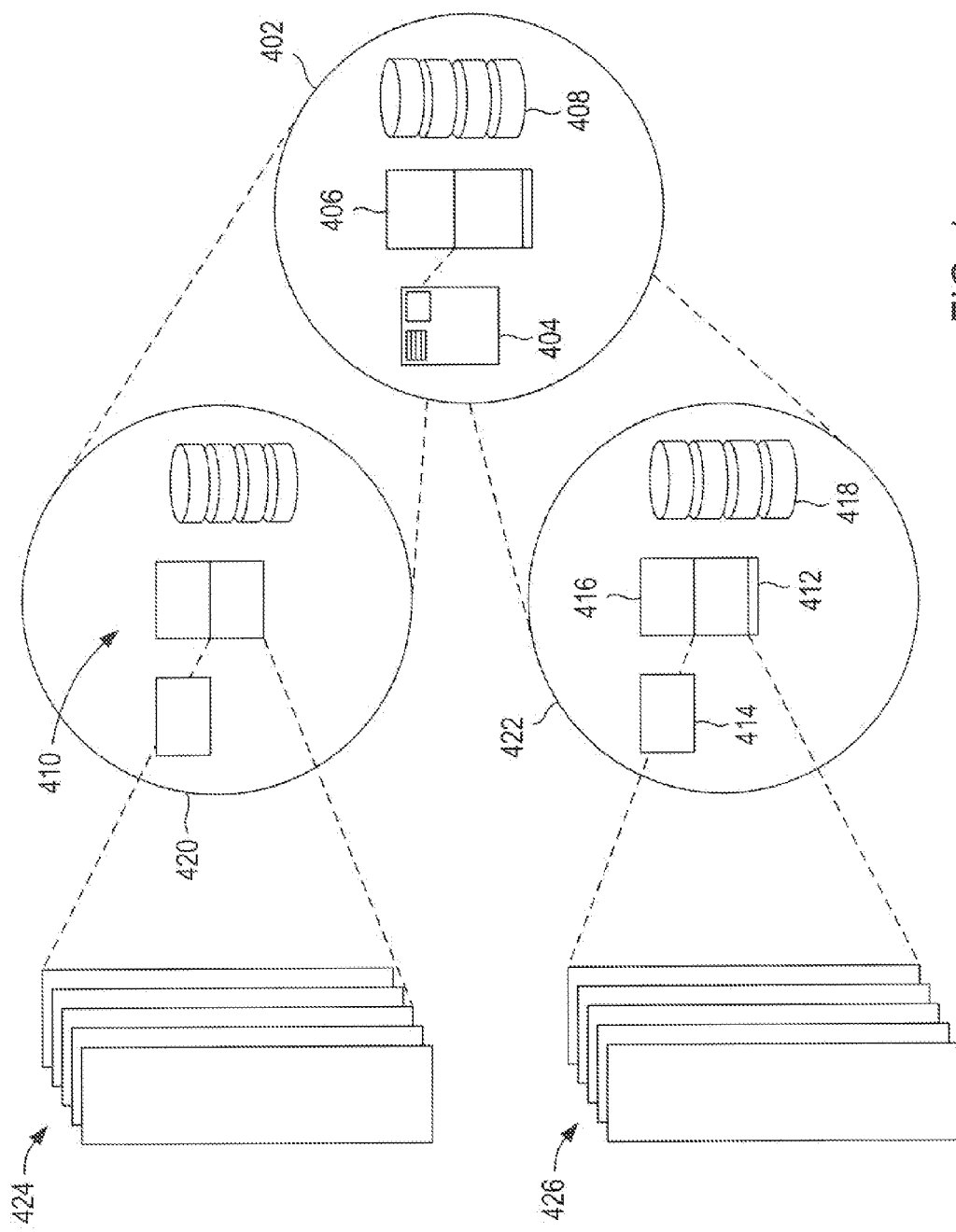
FIG. 4 illustrates a virtual-monitor-based approach to supporting multiple, concurrently executing operating systems.

A virtual-machine monitor is a set of routines that lie above the physical machine interface, and below all other software routines and programs that execute on a computer system. A virtual-machine monitor, also referred to as a "hypervisor" or simply as a "monitor," provides a virtual-machine interface to each operating system concurrently executing on the computer system. The virtual machine interface includes those machine features and characteristics expected of a machine by operating systems and other programs that execute on machines. For example, a virtual-machine interface often includes a virtualized virtual-memory-system interface. FIG. 4 illustrates a virtual-monitor-based approach to supporting multiple, concurrently executing operating systems. In FIG. 4, a first circle 402 encloses the physical, processor 404, physical memory 406, and mass-storage devices 408 of a computer system. The first enclosing circle 402 represents a virtual-machine monitor, a software layer underlying the traditional operating-system software layer of the computer system. The virtual-machine monitor provides virtual-machine interfaces 410 and 412. The virtual machine can be considered to include virtual computational resources, including a virtual processor, virtual physical memory, and virtual mass-storage devices, 414, 416, and 418, respectively. Operating system software layers can be considered: to encapsulate each virtual machine, such as operating systems 420 and 422 represented by circles in FIG. 4. In turn, the operating systems each provide a number of guest-virtual-memory address spaces 424 and 426 to processes concurrently executing within the execution environments provided by the operating systems. The virtual-machine monitor may provide multiple virtual processors to guest operating systems, and may provide a different number of virtual processors than the number of physical processors contained in the computer system.

Discussion of Several Examples of the Present Invention

Figure 5:
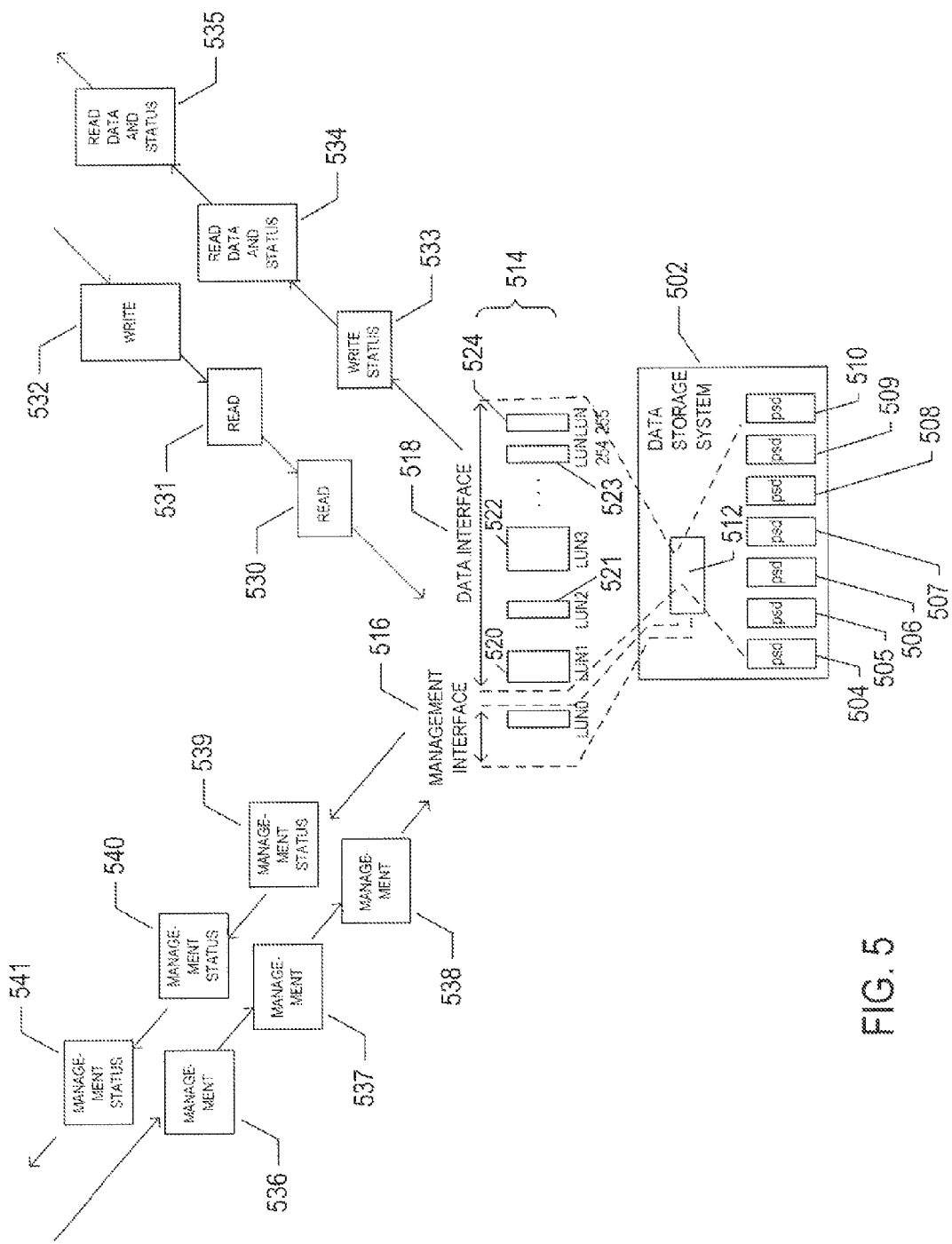
FIG. 5 illustrates an example of a data-storage-system interface that allows host computers to access data stored on data-storage devices within the data-storage system and to manage the data-storage system through a data-storage-system management interface.

FIG. 5 illustrates an example of a data-storage-system interface that allows host computers to access data stored on data-storage devices within the data-storage system and to manage the data-storage system through a data-storage-system management interface. In FIG. 5, a data-storage system 502 is shown to include a number of physical data-storage devices 504-510 and a controller component 512 that provides an abstract, data-storage-system interface 514 to remote, accessing host computers. The data-storage-system interface includes a management interface 516 and a data interface 518. The data interface 518 comprises a number of logical units 520-524, each associated with a logical-unit number ("LUN"). In certain data-storage system interfaces, the data-storage system may support up to a maximum number of LUNs, such as LUNs within the set $\{0, 1, \ldots, 255\}$. The LUNs are names for virtual data-storage devices which contain user data, just like physical data-storage devices contain data. The virtual data-storage devices, or LUNs, are mapped by the controller 512 to the physical data-storage devices 504-510. The data stored within a particular LUN may be mapped across multiple physical data-storage devices, and the data-storage capacity of a LUN may be less than, equal to, or greater than that of an individual physical data-storage device.

Host computers direct, through a communications medium, such as Fibre Channel, Ethernet, and other storage-area networks or local-area networks, data-access commands, such as READ commands 530 and 531 and WRITE commands 532 via the data interface 518 to LUNs. These data-access commands are processed by the controller 512, which carries out corresponding READ and WRITE operations to physical data-storage devices in order to execute the received commands. The controller returns status responses and/or data to accessing host computers 533-535. In general, a data-storage system provides the data interface to multiple accessing host computers and to potentially many different applications and system programs executing within the host computers. The commands and responses to the commands are generally packaged within communications messages that include headers which identify the sending and receiving entities as well as the command or response type, length of included data, and other information.

In parallel with receiving and responding to data-access commands, the data-storage system receives management commands 536-538 from remote host computers, executes the management commands, and returns status and information-containing responses 539-541 through the management interface 516. In certain types of data-storage systems, including certain types of small-computer-system-interface ("SCSI") data-storage systems, the management interface involves a special LUN, LUN0, to which management commands can be directed by host computers. Use of LUN0 as a management interface provides a convenient, consistent, LUN-based data-storage-system interface partitioned into a management interface, implemented as LUN0, and a data interface, implemented as logical units with LUNs selected from the range $\{1, 2, \ldots, 255\}$. For, the purposes of describing the present invention, a LUN-based data-storage-system interface is assumed, although, for different types of data-storage systems, other types of data-storage-system interfaces may be employed.

Figure 6A:
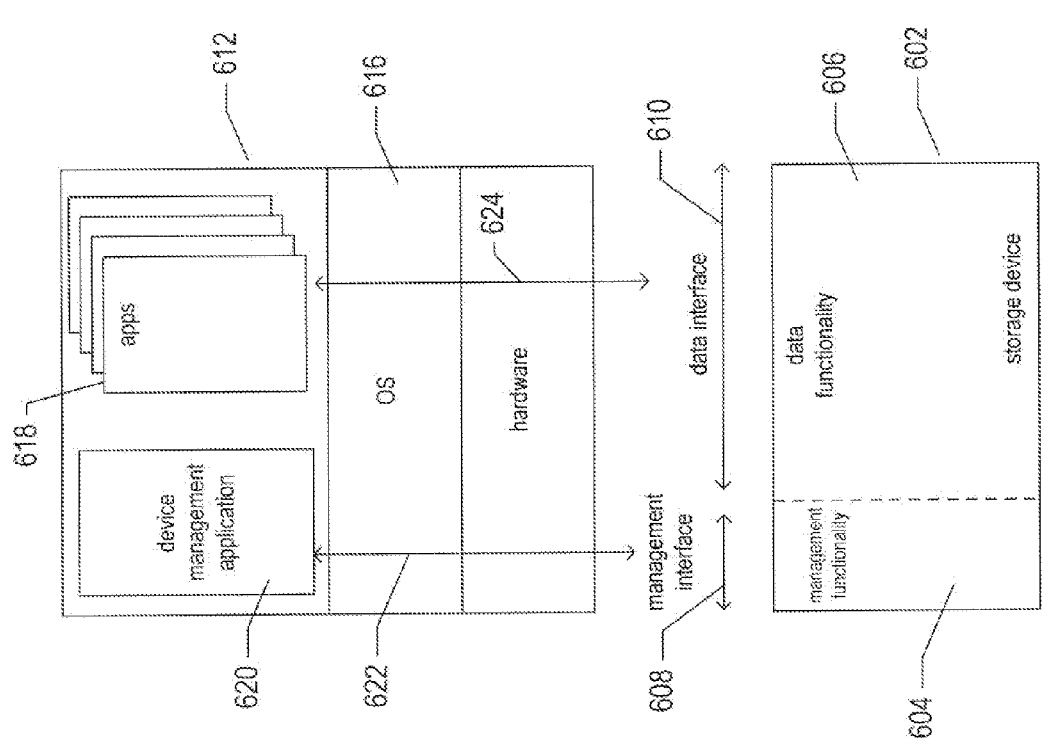
Figure 6C:
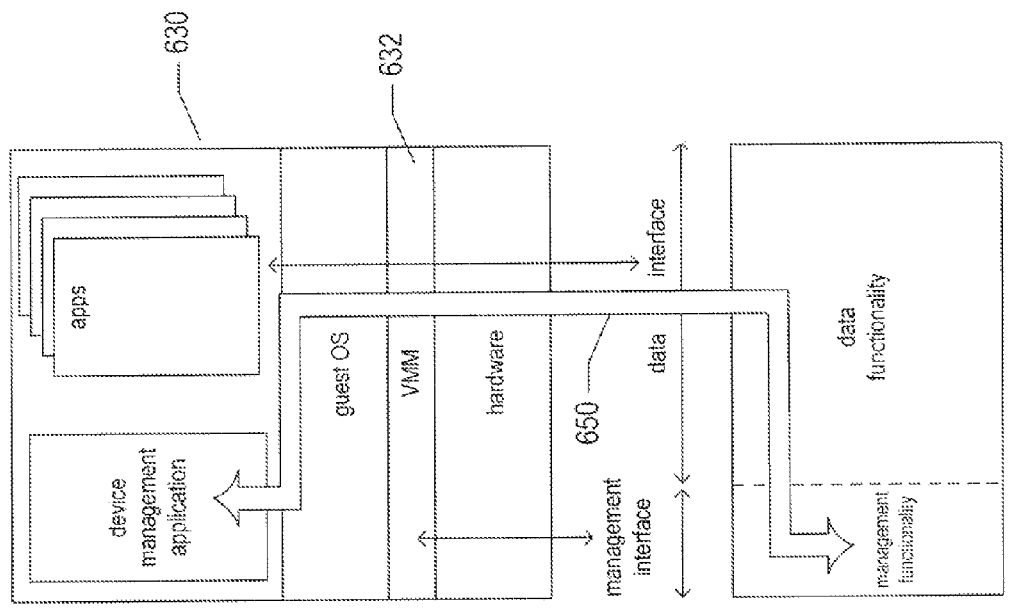

FIGS. 6A-C illustrate projection of the data-storage-system interface through various layers of a remote computer system including, as an example of the present invention shown in FIG. 6C, by means of a management-interface tunnel through an intervening virtual-machine monitor or hypervisor. FIGS. 6A-C all use the same basic illustration conventions, next described with respect to FIG. 6A. In FIG. 6A, the storage device 602 is represented by a block that includes management functionality 604 and data functionality 606, with the management functionality accessed through a management interface 608 and the data functionality accessed through a data interface 610, as in FIG. 5. A remote host computer 612 includes a physical hardware layer 614, an operating system 616 running above the physical hardware layer, and various applications 618 running in the execution environment provided by the operating system, including a device-management application 620. In general, the various applications 618 other than the device-management application 620 may access data stored by the data-storage device through the data interface 610. In general, these applications rarely, if ever, attempt to manage the data-storage system through the management interface. By contrast, the device-management application 620 provides a management facility, to system administrators and other users, that allows the system administrators and other users to configure and manage a variety of remote data-storage systems. The device-management application 620 therefore primarily accesses the data-storage system 602 through the management interface 608. Of course, the device-management application may also access data stored on various data-storage devices. In FIG. 6A, double-headed arrow 622 indicates that the device-management application 620 primarily accesses the data-storage system through the management interface, in order to manage the data-storage device, while double-headed arrow 624 indicates that the various other applications 618 executing on the remote computer system 612 primarily access data stored on the data-storage device through the data interface. When the hardware layer 614 and operating-system layer 616 of the computer system 612 discover remote data-storage systems through various discovery processes, the operating system exposes the LUN0 management interface as well as other LUNs of the data interface to higher-level programs executing within the execution environment provided by the operating system.

FIG. 6B shows the data-storage system and a remote, accessing computer system using the same illustration conventions as used in FIG. 6A. However, in FIG. 6B, the remote computer system 630 includes a virtual-machine monitor layer 632 that runs directly above the physical hardware layer 634 and below one or more guest operating systems 636. Various applications 638 and a device-management application 640 run within the execution environment provided by the guest OS 636 within a virtual-machine context provided by the virtual-machine monitor 632. In this remote computing environment, the physical hardware layer 634 and virtual-machine monitor 632 control the remote-device discovery process. The virtual-machine monitor, in general, exercises complete control over physical hardware, including access to remote devices, and selectively exposes physical resources, including remote devices, through virtual-machine interfaces. Certain virtual-machine monitors do not expose the LUN0-based management interface of a remote data-storage system to the virtual machines running above the virtual-machine monitors. Exposing the LUN0 management interface could, like exposing various protected system resources in physical hardware, lead to inconsistent and potentially catastrophic management of physical-hardware resources by multiple guest operating systems, and can also lead to severe security breaches and other undesirable effects and characteristics. The virtual-machine monitor, as indicated by double-headed arrow 642, generally exposes the LUNs associated with the data interface to virtual machines, including guest operating systems and higher-level software executing within the execution contexts provided by virtual machines, but, as indicated by double-headed arrow 644, does not expose the LUN0 management interface to virtual machines running above the virtual-memory monitor. Lacking access to the LUN0-based management interface, the device-management application 640 can no longer manage the remote data-storage system, unlike the case shown in FIG. 6A where the operating system running above the physical hardware of the remote computer system exposes LUN0 to the device-management application.

In order to expose the management interface to programs executing in the execution environment provided in the context of virtual machines, according to one example of the present invention, a management-interface tunnel is created to bypass the control that would otherwise be exercised by a virtual-machine monitor over exposure of the management interface to virtual machines. FIG. 6C illustrates, using the same illustration conventions as used in FIGS. 6A-B, a management-interface tunnel that represents one example of the present invention. The management-interface tunnel 650 appears, to the virtual-machine monitor 632 of the remote computer system 630, as part of the data interface of the remote data-storage system rather than as part of the management interface. As one example; a different. LUN than LUN0 can be used by programs executing in the context of a virtual machine as the management-interface LUN, in which case the virtual-machine monitor allows programs executing within a virtual-machine context to send management commands to, and receive management-command responses from, the remote data-storage system. In other words, as shown in FIG. 6C, by creating the management-interface tunnel 650, the data-storage system and virtual machine can conceal the normally accessed management interface of the data-storage system from an intervening virtual-machine monitor, allowing applications executing within the execution context of virtual machines to direct management commands through the management-interface tunnel to the data-storage system and to receive responses to those commands from the data-storage system through the management-interface tunnel.

Figure 7:
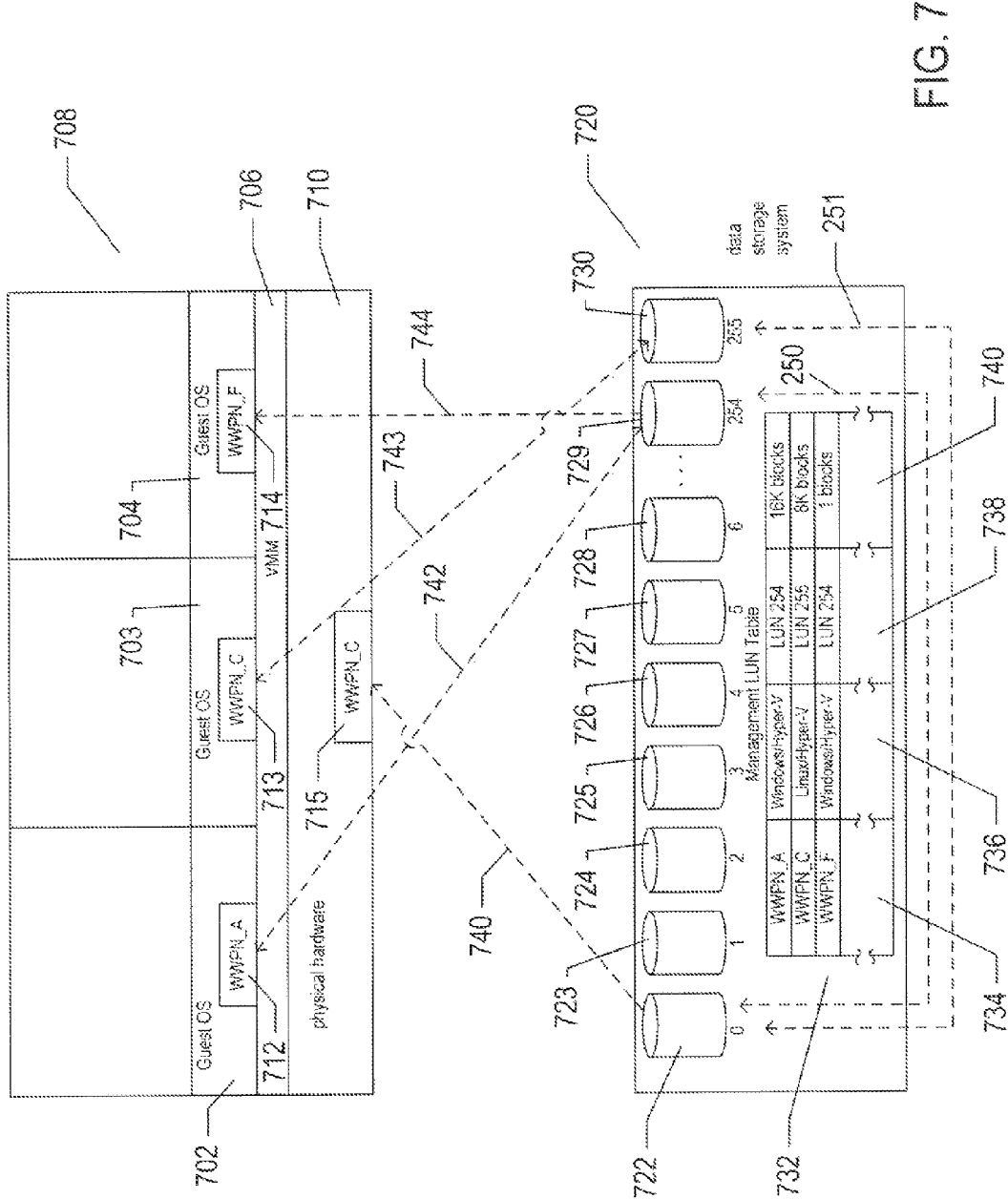
FIG. 7 illustrates implementation of the management-interface tunnel illustrated in FIG. 6C as an example of the present invention.

FIG. 7 illustrates implementation of the management-interface tunnel illustrated in FIG. 6C as an example of the present invention. FIG. 7 provides additional details with regard to information maintained within the data-storage system, in a table or data structure stored in memory and/or in mass-storage devices, as well as additional information with respect to communications between virtual machines, the virtual-machine monitor, and the data-storage device.

In FIG. 7, each guest operating system 702-704 executing within the execution context of a virtual machine above the virtual-machine monitor 706 of a computer system 708, and the physical hardware layer 710 of the computer system, are associated with communications addresses 712-715. In FIG. 7, these physical and virtual port addresses are shown as Fibre-Channel world-wide port names ("WWPNs"), with letters separated by underline symbols from the acronym "WWPN" used to indicate different WWPNs. Were another type of storage-area network communications medium employed to interconnect the remote computer system 708 with the data-storage system 720, different types of addresses may be associated with virtual and physical ports. In the environment shown in FIG. 7, guest operating systems 702 and 704 have unique WWPNs while guest operating system 703 shares the WWPN corresponding to the physical hardware port of the physical hardware layer 710. In certain systems, a physical computer system 708 may be allocated a number of WWPNs that are globally unique, from which individual WWPNs can be assigned to guest operating systems and other computational entities. For purposes of describing the present invention, the WWPNs can be thought of as communications addresses.

The data-storage system 720 provides a LUN-based data-storage-system interface, as discussed above with reference to FIG. 5. LUN0 722 is the special LUN that represents the management-interface portion of the data-storage-system interface, while additional LUNs LUN1, LUN2, . . . , LUN255 723-730 are defined through the management interface and accessed via data-access commands by various computational entities running on remote host computers. In order to implement the management-interface tunnel shown in FIG. 6C, the data-storage system maintains a table 732 of management-interface alternative target LUNs. The table includes four columns: (1) the communications address associated with an accessing computational entity 734; (2) an indication of the type of guest operating system, virtual-machine, and/or virtual-machine monitor environment in which the computational entity executes 736; (3) the particular management-interface alternative target LUN used by the computational entity 738; and (4) a formal data-storage capacity associated with the management-interface target LUN 740. Each row of the management-interface alternative-target-LUN table represents a particular guest operating system and/or virtual-machine monitor. Initially, the data-storage system configures, for the virtual-machine monitor communication address 734, each of the management-interface alternative-target LUNs (729 and 730 in FIG. 7) as write-protected data LUNs having the formal storage capacity indicated in column 740 of table 732. When a virtual-machine monitor issues a management-interface command to determine the identities of LUNs provided by a data storage device, the data-storage system reports the management-interface alternative target LUNs to the virtual-machine monitor as presented and having the formal capacity indicated, in table 732, for the virtual-machine monitor. As shown in FIG. 7, the virtual-machine monitor 706 of the remote computer system may directly issue management commands to the standard LUN0-based management interface, as indicated by dashed double-headed arrow 740, and, during a device-discovery process, discovers and has visibility to the management-interface alternative target LUNs 729-730. Guest operating systems obtain visibility to those management-interface alternative target LUNs appropriate for the guest operating systems when they undertake their own device-discovery process, which is virtualized on their behalf by the virtual-machine monitor. Because all three guest operating systems 702-704 execute in virtual-machine contexts above the virtual-machine monitor, the guest operating systems and application programs running in the execution environments provided by the guest operating systems direct management commands to the management-interface alternative target LUNs 729-730, as indicated by dashed, double-headed arrow 742-744.

The management-interface alternative target LUNs can be used as normal data LUNs in additional to being used as management-interface alternative-target LUNs. This is possible because the data-storage system can determine, from the command type included in a communications-message header, whether a command directed to a particular LUN is a management command or a data-access command. In the former case, by indexing an appropriate row in the management-interface alternative-target-LUN table 732 using the communications address corresponding to the sender of the communications message including the management command, the data-storage system can interpret the received management command as a valid management command received from a computational entity associated with the communications address, and can internally forward the command to the normal LUN0-based management interface, as indicated by dashed double-headed arrows 250-251 in FIG. 7. When an incoming communications message includes a data-access command directed to a management-interface alternative target LUN and when the target LUN has been allocated, configured and presented as a data LUN to the virtual-machine monitor and, when the incoming message is sent from a guest OS, the target LUN has been allocated, configured and presented as a data LUN to the guest OS, the data-storage system treats the received data-access command as any other data-access command directed through the data interface, portion of the data-storage-system interface. Thus, allocation of management-interface alternative-target LUNs in order to create management-interface tunnels does not impact or constrain the traditional data-interface portion of the data-storage-system interface. Because the management-interface alternative-target-LUN table 732 includes indications of the virtual-machine monitor, virtual machine, and/or guest operating system environment within which accessing computational entities execute, the data-storage system can return responses to management commands appropriate for each virtual-machine monitor, virtual-machine, and/or and guest OS. Thus, the data-storage system can provide different, host-dependent management, interfaces to accessing entities executing within different contexts within different host computers.

Figure 8:
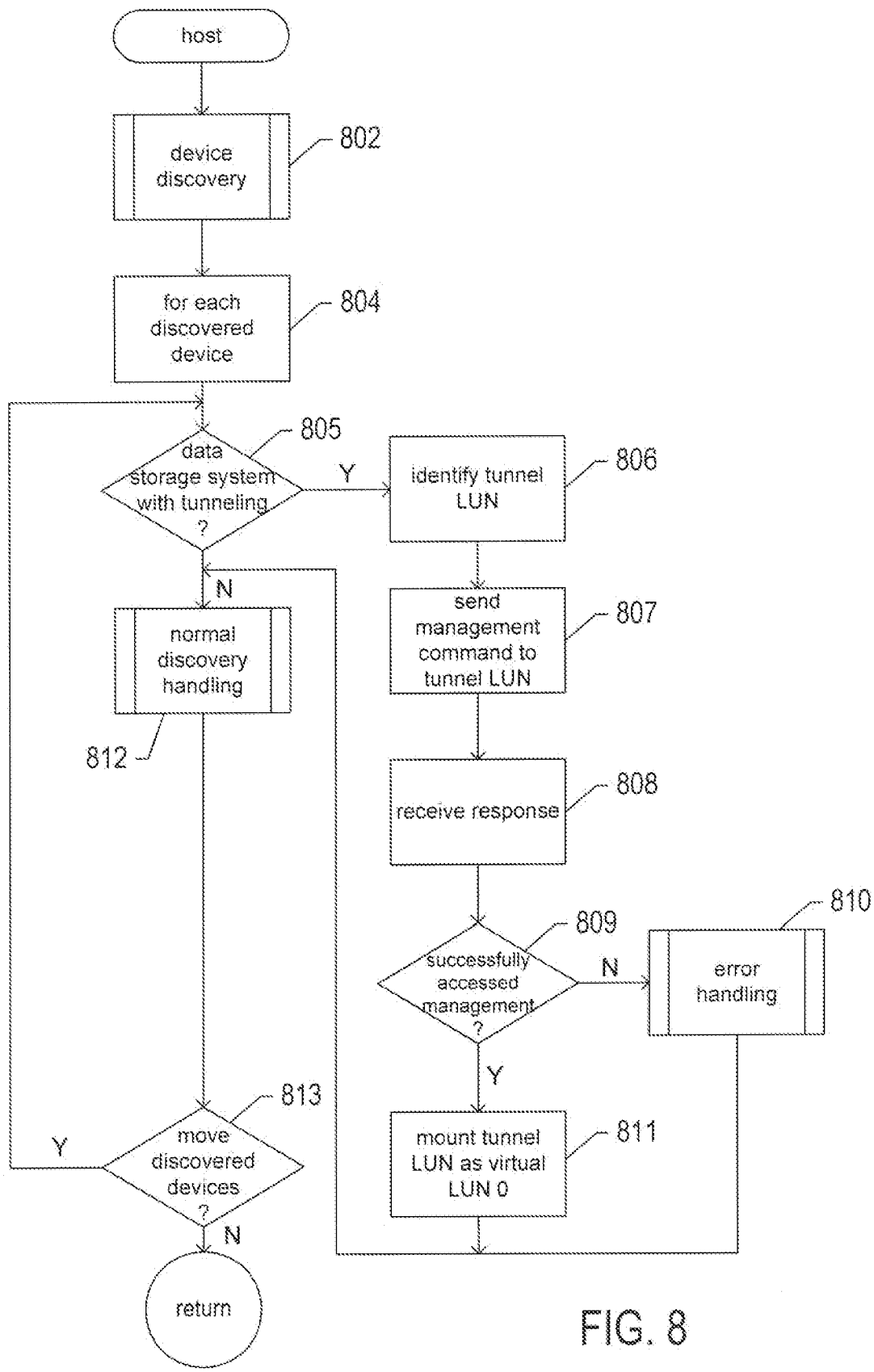
FIG. 8 provides a control-flow diagram that illustrates host-computer implementation of a management-interface tunnel that is an example of the present invention.
Figure 9:
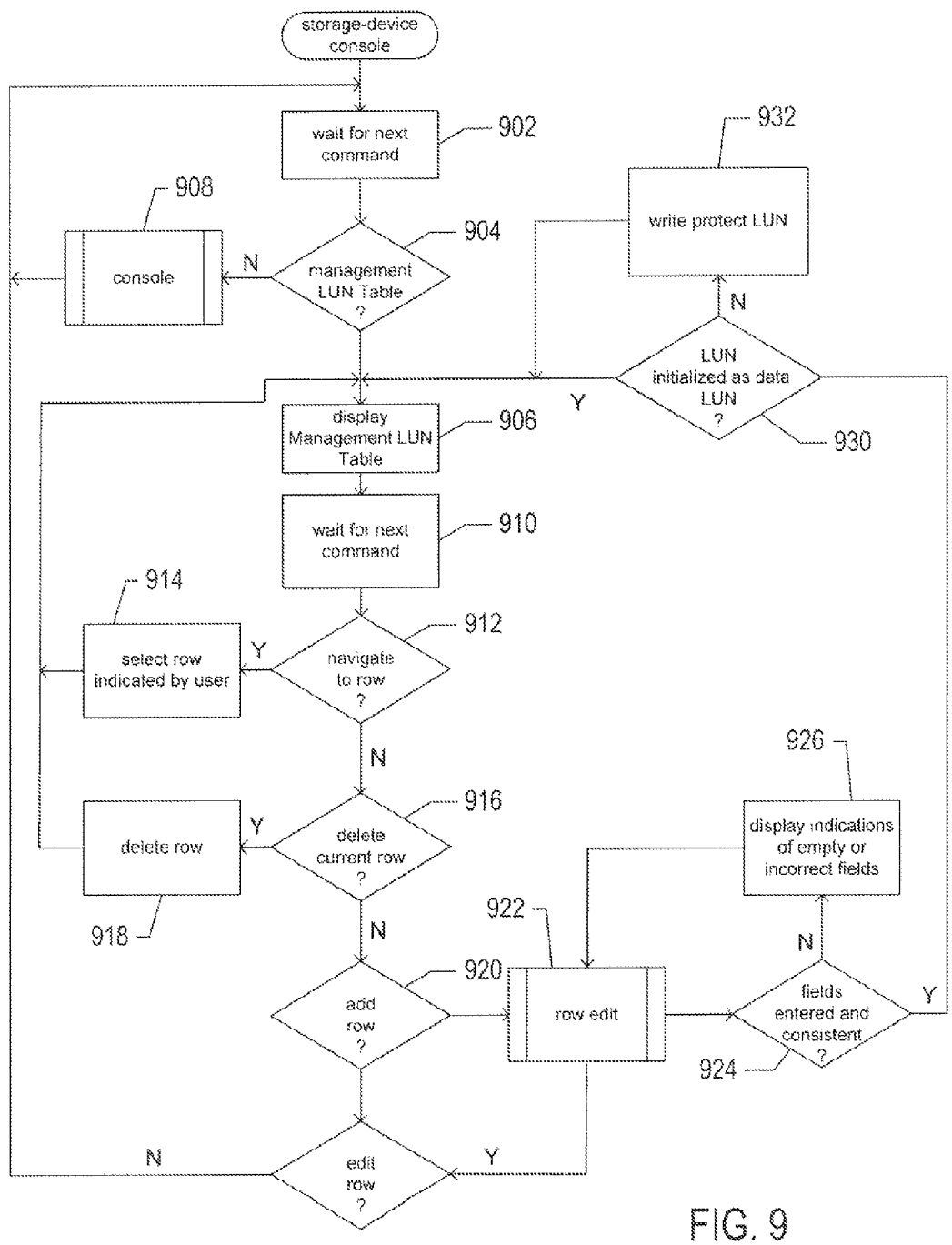
FIG. 9 provides a control-flow diagram that illustrates changes to the portion of the controller of a data-storage system that implements console functionality in order to provide an interface for system administrators and other users to create and edit entries, in the management-interface alternative-target-LUN table discussed above with reference to FIG. 7.
Figure 10:
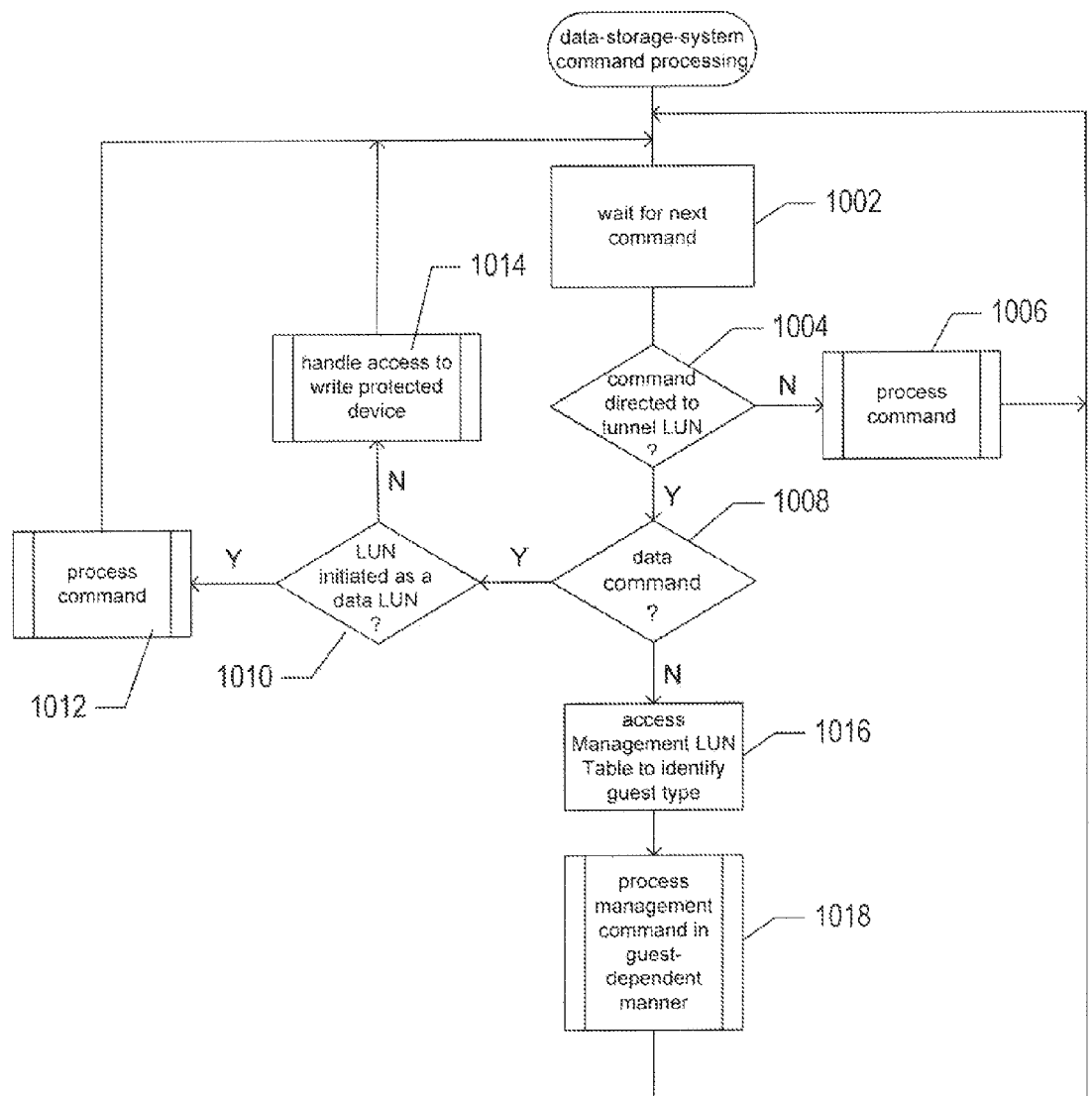
FIG. 10 provides a control-flow diagram that illustrates changes made to the controller logic of a data-storage system to implement management-interfaced tunneling.

As can be readily surmised from FIG. 7, implementation of management-interface tunnels largely involves modification of controller-logic storage of the management-interface alternative-target-LUN table within data-storage systems. In addition, slight changes may be made to virtual machines and/or guest operating systems and/or application programs that access the management interface of remote data-storage systems. FIGS. 8-10, discussed below, represent changes to a guest operating system and to data-storage-system controller logic to implement management-interface tunneling as one example of the present invention. Management-interface tunneling can be implemented, alternatively, in various different ways, including by using different methods for defining and storing information related to management-interface alternative-target LUNs, different methods for making these alternative-target LUNs available to remote computational entities, and other such differences.

FIG. 8 provides a control-flow diagram that illustrates host-computer implementation of a management-interface tunnel that is an example of the present invention. In block 802, device discovery is carried out by the host computer system and, in the case of a host computer system in which a virtual-machine monitor executes, device discovery is virtualized by the virtual-machine monitor for the guest operating system. Initial device discovery is generally undertaken by the virtual-machine monitor when a computer system is first powered up and initialized, and may be additionally undertaken at various subsequent points in time, or may be triggered by various communications-media and internal-bus events. In the for-loop of blocks 804-813, each newly discovered device is handled.

In one example of management-interface alternative-target LUN discovery implementation according to the present invention, the data-storage system is a SCSI data-storage system. In this case, responses to the following discovery commands include different information in the case of an alternative target LUN than in the case of LUN0 discovery: SCSI READ CAPACITY, INQUIRY, SCSI MODE SENSE, FORMAT DEVICE, and RIGID DISK GEOMETRY. The changes involve the write-protected state of tunneling LUNs that have not been initialized as data LUNs and the formal data-storage capacity of tunneling LUNs specified as entries in the management-interface alternative-target-LUN table. When a guest operating system receives, through a virtualized device-discovery process, LUN-associated characteristics indicative of a LUN as being an management-interface alternative-target LUN, the guest operating system can infer that management commands can be issued to the LUN. In this way, the concealment of LUN0 by the virtual-machine monitor can be circumvented, without changes to the virtual-machine monitor.

In block 805, when the newly discovered device is a data-storage system that provides management-interface tunneling, then, in block 806, a management-interface alternative target LUN is identified within the newly discovered device and, in blocks 807-808, the guest operating system sends a management command to the alternative management-interface target LUN and receives a response from the data-storage system. When the guest operating system has successfully accessed the management interface of the data-storage system through the management-interface alternative-target LUN, in steps 806-808, the guest operating system mounts the management-interface alternative-target LUN, or tunnel LUN, as virtual LUN0 in block 811. Otherwise, various types of error handling may be undertaken, in block 810, to properly identify, access, and mount a management-interface alternative target LUN, or tunnel LUN, as LUN0. When a newly discovered device is not a data-storage system featuring management-interface tunneling, then normal discovery handling, is undertaken in block 812. When there are more newly discovered devices, as determined in block 813, control returns to block 805. Thus, a guest operating system recognizes a device accessible via a communications medium as a data-storage system featuring management-interface tunneling and mounts a management-interface alternative target LUN as LUN0 in order to initialize itself and the execution environment that it provides for application programs to provide for access to the management interface of a data-storage system through virtual LUN0.

FIG. 9 provides a control-flow diagram that illustrates changes to the portion of the controller of a data-storage system that implements console functionality in order to provide an interface for system administrators and other users to create and edit entries in the management-interface alternative-target-LUN table discussed above with reference to FIG. 7. In block 902, the console routine waits for a next console command. When the console command invokes display and editing of the management-interface alternative-target-LUN table, as determined in block 904, then control flows to block 906. Otherwise, normal console functionality is carried out in block 908. In block 906, the management-interface alternative-target-LUN table is graphically displayed to a user on a display device. Then, in step 910, the console routine waits for a next command associated with editing of the management-interface alternative-target-LUN table. When a new command is received, control flows to block 912, in which the console routine determines whether or not the command is a navigation command issued by the user to direct a row cursor to a particular row in the displayed management-interface alternative-target-LUN table. When the new command is a navigation command, the target row is selected by the routine in block 914. Selection of the row may involve highlighting the row on the graphical interface. When the newly-received command is a delete-current-row command, as determined in block 916, then the current row is deleted in block 918 and the management-interface-alternative-target-LUN table redisplayed in step 906. When the newly-received command is a command to add a row to the management-interface alternative-target-LUN table, as determined in block 920, then row-editing functionality is deployed, in block 922, to allow a user to navigate to particular fields of the row, corresponding to columns of the management-interface alternative-target-LUN table, and input or modify values, for those fields. When indication, is made by the user that editing of the row is complete, then, in block 924, the console routine determines whether values for all fields have been entered and are consistent with expected values. When information is inconsistent or lacking, then an indication of the inconsistent or lacking information is displayed to the user, in block 926, and the row-editing functionality re-deployed, in step 922. The row-editing functionality may allow a user to delete an incomplete row when the user cannot properly complete the row. When the newly headed row is properly completed, as determined in block 924, then, in block 930, the console routine determines whether or not the indicated alternative target LUN has been initialized as a data LUN. When the indicated target LUN has not yet been initialized as a data LUN, then the alternative target LUN is WRITE protected, in step 932, so that the alterative target LUN is not inadvertently allocated by a virtual-machine monitor.

FIG. 10 provides a control-flow diagram that illustrates changes made to the controller logic of a data-storage system to implement management-interface tunneling. The logic shown in FIG. 10 is introduced into received-command-processing logic of the controller. In block 1002, the controller waits for a next command to be received. When the next command is received, the controller determines, in block 1004, whether the command is directed to an alternative target LUN, or tunnel LUN. This determination can be made from the information stored in the management-interface alternative-target-LUN table stored within the data-storage system. When the command is not directed to a tunnel. LUN, normal command processing ensues in block 1006. When the command is directed to a tunnel LUN, then, in block 1008, the controller determines whether or not the command is a data-access command. When the command is a data-access command, then, in block 1010, the controller determines whether or not the LUN is initialized and presented as a data LUN. If so, then normal command processing is carried out in step 1012. Otherwise, a controller employs various techniques, depending on the particular controller implementation, to handle an attempted access to a write-protected device, in step 1014. When the received command is directed to a tunnel LUN and is a management command, then the controller accesses the management-interface alternative-target-LUN table to identify the row in the management-interface alternative-target-LUN table corresponding to the accessing entity, in block 1016. Finally, in block 1018, the controller, processes the management command in a guest-dependent or host-dependent fashion according to indications of the guest or host type in the management-interface alternative-target-LUN table.

Although the present invention has been described in terms of particular embodiments, it is not intended that the invention be limited to these embodiments. Modifications will be apparent to those skilled in the art. For example, management-interface tunneling can be implemented in many different ways by varying any of the various implementation parameters, including programming language, development environment, modular organization, data structures, control structures, and other such parameters. Implementation of management-interface tunneling may involve changes to software, firmware, and/or logic circuitry within a data-storage system. Although the LUN0-based management interface of SCSI data-storage systems is discussed above as an example of a management interface amenable to management-interface tunneling, other types of management interfaces that are not exposed by virtual-machine monitors to virtual machines may also provide management-interface tunneling by providing for interaction of management commands through the data-interface portion of the data-storage system interface. As one example, the guest operating system may expose a management-interface alternative target LUN directly to applications, rather than mounting the management-interface alternative target LUN as virtual LUN 0, and the application is changed to issue management commands to the management-interface alternative target LUN rather than to LUN0. As another example, a virtual-machine monitor may be altered to virtualize a management-interface alternative target LUN as LUN0 on behalf of a virtual machine and guest operating system operating within the context of the virtual machine. In certain cases, the virtual-machine monitor may, after device, discovery, designate the discovered management-interface alternative target. LUNs as not used or controlled by the virtual-machine monitor before exposing the management-interface alternative target LUNs to virtual machines and guest operating systems.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

The invention claimed is:

1. A data-storage system comprising:
   a plurality of data storage devices;
   one or more communications connections through which the data-storage system receives management and data-access commands and sends responses to received commands; and
   one or more processors that execute controller functionality that controls command and response exchanges through the communications connections, accesses the data-storage devices, and provides a data-storage-system interface that includes a management interface portion that provides access to management functionality, a data-interface portion that provides access to data-access functionality, and a management-interface tunnel that provides alternative access to management functionality through the data-interface portion of the data-storage-system interface.

2. The data-storage system of claim 1
wherein, the data-storage-system interface comprises a number of logical units, each associated with a logical unit number, to which commands are directed;
wherein the data-interface portion of the data-storage-system interface comprises a set of logical units to each of which data-access commands are directed and with each of which a data-storage capacity is associated; and
wherein the management-interface portion of the data-storage-system interface includes at least one logical unit to which management commands are directed.

3. The data-storage system of claim 2 wherein the management-interface tunnel comprises at least one alternative management-interface target logical unit selected from among the set of logical units of the data-interface portion of the data-storage system to which management commands are directed.

4. The data-storage system of claim 3 wherein data-access commands are directed to the at least one alternative management-interface target logical unit in addition to management commands.

5. The data-storage system of claim 3 further including a management-interface alternative-target-logical-unit table that is stored in memory within the data-storage system and that is created and managed by the controller functionality.

6. The data-storage system of claim 5 wherein the management-interface alternative-target-logical-unit table includes entries that each includes:
a field that stores a communications address associated with an accessing computational entity;
a field that stores an indication of a virtual-machine type corresponding to a virtual machine that provides an execution context within which the accessing computational entity executes;
a field that stores a logical unit number associated with the management-interface alternative target logical unit that implements a management-interface tunnel for the accessing computational entity; and
a field that stores a formal data capacity that is associated with the management-interface alternative target logical unit.

7. The data-storage system of claim 5 wherein the data-storage system provides console functionality for displaying, creating, and editing the management-interface alternative target-logical-unit table.

8. The data-storage system of claim 5 wherein the controller functionality within the data-storage system, upon receiving a command through the one or communications connections, executes the command by:
determining, using information stored in the management-interface alternative-target-logical-unit table, whether or not the command is directed to a management-interface alternative-target logical unit; and when the command is directed to a management-interface alternative-target logical unit,
when the command is a data-access command and the management-interface alternative-target logical unit has been configured as a data-access logical unit, processes the command by accessing data associated with the data-access logical unit, and
when the command is a management command and the management-interface alternative-target-logical-unit table includes an entry corresponding to the computational entity from which the command was received, processes the command by forwarding the command to the management functionality associated with the management-interface portion of the data-storage-system interface.

9. The data-storage system of claim 8 wherein, when the command is a management command and the management-interface alternative-target-logical-unit table includes an entry corresponding to the computational entity from which the command was received, the controller functionality processes the command in a host-dependent manner according to an indication, stored in the management-interface alternative-target-logical-unit table, of a type of virtual-machine on which the computational entity from which the command was received executes.

10. The data-storage system of claim 5 wherein the controller functionality within the data-storage system initially write protects each management-interface alternative-target logical unit, removing write protection when the management-interface alternative-target logical unit is subsequently configured as a data-access logical unit.

11. A host system comprising:
a physical hardware layer;
a virtual-machine monitor that executes above the physical hardware layer;
a guest operating system that executes within a virtual-machine context provided by the virtual-machine monitor; and
a computational entity that executes within an execution environment provided by the guest operating system and that accesses management functionality of a data-storage system through a management-interface tunnel provided by the data-storage system wherein the data-storage system provides a data-storage-system interface that includes a management-interface portion that provides access to management functionality, a data-interface portion that provides access to data-access functionality, and the management-interface tunnel that provides alternative access to management functionality through the data-interface portion of the data-storage-system interface.

12. The host system of claim 11
wherein the data-storage-system interface comprises a number of logical units, each associated with a logical unit number, to which commands are directed;
wherein the data-interface portion of the data-storage system interface comprises a set of logical units to each of which data-access commands are directed and with each of which a data-storage capacity is associated; and
wherein the management-interface portion of the data-storage-system interface includes at least one logical unit to which management commands are directed.

13. The host system of claim of claim 12 wherein the management-interface tunnel comprises at least one alternative management-interface target logical unit selected from among the set of logical units of the data-interface portion of the data-storage system to which management commands are directed.

14. The host system of claim 13 wherein the guest operating system discovers the data-storage system through a virtualized device-discovery process, determines a management-interface alternative-target logical unit for the data-storage system and mounts the management-interface alternative-target logical unit as a virtual logical unit corresponding to a logical unit included in the management-interface portion of the data-storage-system interface.

15. The host system of claim 14 wherein the computational entity accesses management functionality of the data-storage system by directing management commands to the virtual logical unit.

16. A method for providing access to management functionality of a data-storage system that provides a data-storage-system interface which includes a management-interface portion that provides access to the management functionality and a data-interface portion that provides access to data-access functionality, the method comprising:
    including, within the data-storage-system interface, a management-interface tunnel that provides alternative access to management functionality through the data-interface portion of the data-storage-system interface;
    maintaining, in memory within the data-storage system, an association between an accessing computational entity and an access feature of the data-interface portion of the data-storage-system interface to which the computational entity directs management commands; and
    processing management commands directed to the access feature of the data-interface by the computational entity by forwarding the management commands to the management functionality.

17. The method of claim 16
    Wherein the data-storage-system interface comprises a number of logical units, each associated with a logical unit number, to which commands are directed;
    wherein the data-interface portion of the data-storage-system interface comprises a set of logical units to each of which data-access commands are directed and with each of which a data-storage capacity is associated; and
    wherein the management interface portion of the data-storage-system interface includes at least one logical unit to which management commands are directed.

18. The method of claim 17 wherein the management-interface tunnel comprises at least one alternative management-interface target logical unit selected from among the set of logical units of the data-interface portion of the data-storage system to which management commands are directed.

19. The method of claim 18 further including maintaining a management-interface alternative-target-logical-unit table that is stored in memory within the data-storage system and that includes entries corresponding to accessing computational entities, each entry including:
    a field that stores a communications address associated with an accessing computational entity;
    a field that stores an indication of a virtual-machine type corresponding to a virtual machine that provides an execution context within which the accessing computational entity executes;
    a field that stores a logical unit number associated with the management-interface alternative target logical unit that implements a management-interface tunnel for the accessing computational entity; and
    a field that stores a formal data capacity that is associated with the management-interface alternative target logical unit.

* * * * *

UNITED STATES PATENT AND TRADEMARK OFFICE
CERTIFICATE OF CORRECTION

PATENT NO. : 8,489,827 B2
APPLICATION NO. : 12/914079
DATED : July 16, 2013
INVENTOR(S) : George Shin et al.

It is certified that error appears in the above-identified patent and that said Letters Patent is hereby corrected as shown below:

In the Claims

In column 13, line 9, in Claim 2, delete "wherein," and insert -- wherein --, therefor.

In column 14, line 56, in Claim 13, delete "of claim of claim" and insert -- of claim --, therefor.

Signed and Sealed this
Nineteenth Day of November, 2013

Teresa Stanek Rea
*Deputy Director of the United States Patent and Trademark Office*